US008315598B2

(12) United States Patent
Price

(10) Patent No.: US 8,315,598 B2
(45) Date of Patent: Nov. 20, 2012

(54) SYSTEMS AND METHODS FOR GATHERING INFORMATION ABOUT DISCRETE WIRELESS TERMINALS

(75) Inventor: Christopher Price, Denver, CO (US)

(73) Assignee: Prima Research LLC, Denver, CO (US)

( * ) Notice: Subject to any disclaimer, the term of this patent is extended or adjusted under 35 U.S.C. 154(b) by 654 days.

(21) Appl. No.: 12/463,138

(22) Filed: May 8, 2009

(65) Prior Publication Data

US 2010/0285814 A1    Nov. 11, 2010

(51) Int. Cl.
*H04M 3/16* (2006.01)
(52) U.S. Cl. ........... 455/411; 455/414.1; 455/414.2; 455/404.2; 455/456.1; 455/456.2; 455/456.3; 455/456.5; 455/456.6
(58) Field of Classification Search .............. 455/456.1, 455/414.2, 404.2, 456.2, 456.3, 456.5, 456.6, 455/414.1
See application file for complete search history.

(56) References Cited

U.S. PATENT DOCUMENTS

| 4,494,119 | A | * | 1/1985 | Wimbush | 342/457 |
| 2004/0203380 | A1 | * | 10/2004 | Hamdi et al. | 455/41.2 |
| 2005/0192026 | A1 | * | 9/2005 | Carlson et al. | 455/456.1 |
| 2006/0166681 | A1 | * | 7/2006 | Lohbihler | 455/456.2 |
| 2006/0250305 | A1 | * | 11/2006 | Coluzzi et al. | 342/458 |
| 2009/0140841 | A1 | * | 6/2009 | Meyer | 340/10.41 |

* cited by examiner

*Primary Examiner* — Kamran Afshar
*Assistant Examiner* — Khalid Shaheed
(74) *Attorney, Agent, or Firm* — Holland & Hart LLP

(57) ABSTRACT

The present invention is broadly directed to systems and methods for gathering information about wireless transceiver devices in a defined boundary region. To this end, the disclosure is more particularly directed to gathering movement information (e.g., via detection and location) about two-way end-user wireless terminals within three-dimensional boundaries of defined local space ("DLS") to allow for selective control of the terminals and other subsystems, as desired. Additionally, the data collected can be used to improve accuracy and precision regarding the prediction of behavior characteristics and tendencies of populations based on a sampling of observed terminals.

5 Claims, 11 Drawing Sheets

DLS 1 = Property perimeter (Outside space) incl. surface parking
DLS 2 = Building perimeter (Total inside building space)
DLS 3 = Parking garage including "Car Finder" kiosks
DLS 4 = Tenant space monitoring as a fee service
DLS 5 = Common space incl. entrances & Food Court
DLS 6 & 7 = View corridors of display kiosks (e.g. "Smart" display ads)

SYSTEMS AND METHODS FOR GATHERING INFORMATION ABOUT DISCRETE WIRELESS TERMINALS

FIELD OF THE INVENTION

The present invention relates generally to two-way wireless communications services, and more specifically to localized detection, location, and selective control of discrete two-way wireless terminals within determined three-dimensional boundaries of a defined local space ("DLS").

BACKGROUND OF THE INVENTION

To artisans minimally skilled in wireless radio communication, it is well known that basic detection and subsequent location of a given continuously emitting wireless transmitter can be accomplished by merely connecting a radio receiver to one or more directional antennas and employing signal peaking methods. Such radio direction finding ("RDF") techniques have been used successfully over many years to locate ships, planes, and individuals in distress. Single-receiver techniques sometimes employ null measurements to improve the final precision of directional measurements, but such null measurements rely on adequate carrier-to-interference ratios and may also be compromised by multiple reflected signals ("multipath"). Even with the best directional antennas, single-receiver radiolocation platforms may indicate signal peaks or nulls that turn out to be from reflecting surfaces rather than the desired transmitter itself. Single-receiver techniques at best indicate that one or more transmitted signals exist within a general area without precise boundaries, due in part to the inverse-square-law asymptotic RF signal propagation characteristic of radio waves in free space.

Two-receiver radiolocation platforms provide only modest improvement over single-receiver arrangements. Multipath reflected signals from continuously emitting transmitters can significantly contribute to directional measurement error, and signal-strength boundaries remain poorly defined. Additionally, use of relative time of arrival ("RTOA") radiolocation techniques with only two synchronized receivers for locating digitally modulated RF transmitters will present nearly the same uncertainty as RDF directional measurements of continuously emitting RF transmitters. Two-receiver RTOA radiolocation platforms designed to locate such digitally modulated transmitters will, at best, predict which "disk" of circular area coordinates are possible for a given pair of RTOA values, with the disk being perpendicular to an imaginary line drawn between the two receivers, with the same poor definition of outer signal-strength boundaries.

Three-receiver synchronized radiolocation platforms with RTOA techniques for locating digitally modulated transmitters begin to offer the possibility of improved precision in both location and boundaries definition, in two dimensions only. The physical position of the three synchronized receivers defines the plane of the included two-dimensional area. Transmitters perpendicular to either side of the included two-dimensional plane will reintroduce increasing measurement error, with the same poor definition of outer signal-strength boundaries.

There are several group behavior sampling methods widely used in market research, traffic/crowd analysis and control, retail property management, and similar applications. Typical methods include various combinations of visible human observers, video systems, counting devices, portable scanners linked to a computer system, and similar technologies, to name a few. For group behavior sampling, most existing methods suffer from a relatively low sample rate, observation periods that may or may not coincide with periods of significant changes in behavior, the undesirable effect of the observer's presence influencing behavior in some way that contaminates measurement, and the scope being typically limited to one or just a few points of observation. Observation performed by an individual or a team can be "spotted" or outmaneuvered. Additionally, multiple observers face the challenge of coordinating observations to avoid duplication or other errors that could contaminate the accuracy, precision (or both) of the end result.

Current methods for tracking individuals suffer from many of the same limitations of typical methods used to sample group behavior in defined environments. Additionally, use of so-called intrusive "tracking" devices raises issues of permission, privacy intrusion and potential legal hurdles.

Secure access to buildings and other types of sensitive property typically requires physical keys/access cards that must be produced, distributed and recovered (or electronically disabled) from individuals. Unauthorized copies of keys and access cards can often be made without knowledge and permission of the issuing entity, and multiple levels of security with traditional secure access methods are often mutually exclusive. Taken together, such limitations can effectively obviate actual secure access and virtually always impose high administrative costs for what often turns out to be a relatively low level of actual security.

Certain businesses and other DLS facilities such as theaters, restaurants and churches have attempted to effect "quiet zone" environments by posting notices and/or verbally requesting customers or members to switch off or silence such terminal devices during their presence in the facility. Other facility operators have been reported to engage in the use of illegal "jamming" devices that effectively interdict all wireless terminal devices within facility premises. This method has the additional perverse effect of totally denying electronic access to certain exempt customers or members such as doctors or emergency services personnel, who may need to be instantly notified in the event of medical emergencies and threats to life or property. In this particular scenario, attempts at outgoing communication sessions would also be completely denied because the "jammed" wireless terminal would be unable to initially establish the required two-way session through the overhead "handshaking" protocol of the particular service. Absent some notice by the facility operator, interdiction by illegal jamming techniques would not likely be obvious to visitors with wireless terminals—the wireless terminal device would simply be non-functional without one's knowledge.

The limitations of present methods typically employed in sampling group behavior, tracking individuals, providing secure access, and controlling two-way wireless terminal alerts and operation are generally known by the operators of various DLSs and other entities. Certain methods, while extremely effective (i.e., "jamming"), have the distinct drawbacks of being illegal and/or denying electronic access to critical personnel without their knowledge. As such, a need exists for systems and methods to effectively and legally overcome such limitations in DLS environments. A particular need exists for systems and methods which overcome known limitations of certain applications and enable new services and features not anticipated by current wireless service delivery platforms or other approaches. To this end, systems and methods are desired which realize one or more of the following advantages: improved sampling precision; reduction of sampling inaccuracy; elimination of personal privacy intrusion; improved secure facility access at lower administrative cost; selective local control of two-way wireless terminal alerts and operation within the DLS; automatic control of DLS systems or subsystems such as security cameras; and remote control of systems and subsystems outside DLS boundaries.

SUMMARY

A plurality, and preferably four, synchronized receivers employing RTOA techniques may be arranged to form the points of an equilateral tetrahedron (a four-sided pyramid). This four-receiver platform will provide the ability to accurately locate one or more digitally modulated transmitters anywhere within the three-dimensional space defined by the "faces" of the four-sided pyramid, with excellent precision of the boundaries at the tetrahedron faces or subset spaces thereof. This basic form of the radiolocation platform is described in more detail in the Detailed Description of the Invention.

It is an object of the present invention to provide a new and improved information gathering method and system that overcomes known limitations of current techniques, some of which are noted in the background section.

Another object of the present invention is to provide a method and/or system for monitoring movement of two-way wireless terminals within a DLS.

Still another object of the present invention is to provide such a method and/or system which is non-intrusive and, as such, does not entail actively controlling any two-way wireless terminals about which information is gained.

Still a further object of the present invention is to enable new DLS services and features not anticipated by current wireless service delivery platforms or other architectures.

In accordance with these objectives, the present invention broadly relates to methods and systems for gathering information. A broad form of the method comprises receiving return signals that are transmitted from one or a plurality of two-way wireless terminals within a DLS over a selected time interval, and thereafter processing each of the return signals to ascertain physical location about the signal's associated two-way wireless terminal within the DLS. A particular implementation of this methodology is adapted for monitoring movement of two-way wireless terminals within the DLS. According to this method, a network architecture is provided that includes a plurality of synchronized receivers positioned in a selected array to define the DLS, and at least one processor in communication therewith. During a first time interval, the receivers intercept a first sampling of signals transmitted by an associated set of two-way wireless terminals within the DLS, with each received signal being associated with a particular wireless terminal. Initial location information is logged based on the first sampling of signals. This is repeated during subsequent time intervals whereupon subsequent location information is logged for the set of wireless terminals that are present within the DLS based on repeated sampling of signals. The initial location information and the subsequent location information are compared to ascertain tracking movement of wireless terminals within the DLS.

According to one embodiment of an information gathering system, a DLS architecture is provided and includes the array of synchronized receivers and their associated processor(s). One or a plurality of two-way wireless terminals also comprises part of the system, there being at least one of the wireless terminals physically located within the DLS. A base station is associated with a wireless service provider system and operates to broadcast an associated request signal to each wireless terminal, whereupon each wireless terminal within the DLS is operative to transmit an associated return signal intended for the base station that is also received and processed by the DLS architecture to ascertain physical location information for each wireless terminal that is present within the DLS. Such sampling information can then be used in a non-intrusive manner in any of a variety of applications, as mentioned above in the background section.

In the exemplary embodiments which are described, a plurality of (but preferably at least four) receive-only synchronized wireless devices connected to antennas are placed at or near the boundaries of a DLS, which itself may assume any of a variety of multi-dimensional configurations. The synchronized receive-only devices ("DLS Receivers") communicate with a computer system ("Processor") that detects and records the presence, quantity and location of discrete two-way wireless terminal devices within the DLS by also receiving their return-path transmissions. Unique terminal identification/electronic serial number ("TID/ESN") information embedded within return path transmissions from each two-way wireless terminal may be used to support a variety of applications such as: local-only non-intrusive group or individual behavior data gathering; control of intra-DLS systems and subsystems, indirect control of intra-DLS wireless terminal devices; or remote control of systems and subsystems outside DLS boundaries, to name a few.

Preferably, the resulting DLS receive-only wireless arrangement only monitors wireless signals but does not directly interact with or otherwise directly control two-way wireless terminals of individuals within a DLS. The receive-only wireless monitoring capability is carefully limited to DLS boundaries, which will typically be much different than wireless service providers' defined cells of operation. A DLS is infinitely definable by mathematical representation. It can be virtually any shape and any size. Additionally, DLSs may overlap, be defined as a "shape within a shape" or be associated with other distinct DLSs. Return-path signals containing TID/ESN information unique to discrete two-way wireless terminals within the DLS are received, without association to customer name, address or any other personal information. Such gathered TID/ESN information may be time-stamped and otherwise categorized, for use in a variety of applications that do not require any interaction with customers' wireless service providers. A representative, local-only application could be limited, for example, to control of DLS systems or subsystems such as secure access control devices and security cameras that would automatically "follow" specific two-way wireless terminal(s) movement within a DLS.

Other applications that include indirect control of two-way wireless terminal alert features and other functions of specific wireless terminals within a DLS would necessarily involve prior arrangement with wireless service providers. These indirect-control applications are enabled according to parameters for each terminal-specific TID/ESN detected within the DLS. For such applications, detected TID/ESNs are automatically forwarded to respective wireless service providers that have an RF "presence" within the DLS. This could include, for example, a wireless service provider automatically redirecting all incoming calls to voice mail, for selected wireless customers only during the time that they "appear" in a repetitive upload of TID/ESNs detected within a DLS facility. For all indirect control applications, the present invention does not rely on, nor does it require DLS entity knowledge of wireless customer name, address or any other personal information. It is contemplated that, for doctors or emergency services personnel detected within a "quiet-zone" DLS, the wireless service provider could remotely switch the terminal device to "silent" alert mode. All other wireless terminals detected within the "quiet-zone" DLS would, for example, experience denial of service under the proximate control of their service provider, with all incoming calls being directly forwarded to voice mail and all outgoing call attempts being denied, except for E911 emergency calls.

One example of an application that employs indirect control of systems and subsystems outside the boundaries of one DLS is automatic remote notification of the appearance of a TID/ESN within another non-contiguous DLS location, such as among multiple satellite locations of a geographically diverse entity. Yet another extra-DLS application could require electronic association of credit card number with detected customer TID/ESN before a point-of-sale transaction is remotely authorized.

These and other objects of the present invention will become more readily appreciated and understood from a consideration of the following detailed description of the exemplary embodiments of the present invention when taken together with the accompanying drawings, in which:

DETAILED DESCRIPTION

The present invention summarized above and defined by the enumerated claims below may be better understood by referring to the following detailed description, which should be read in conjunction with the accompanying drawings. This detailed description of the exemplary embodiments is not intended to limit the enumerated claims, but to serve as particular examples thereof. In addition, the phraseology and terminology employed herein is for the purpose of description, and not limitation.

Figure 1:
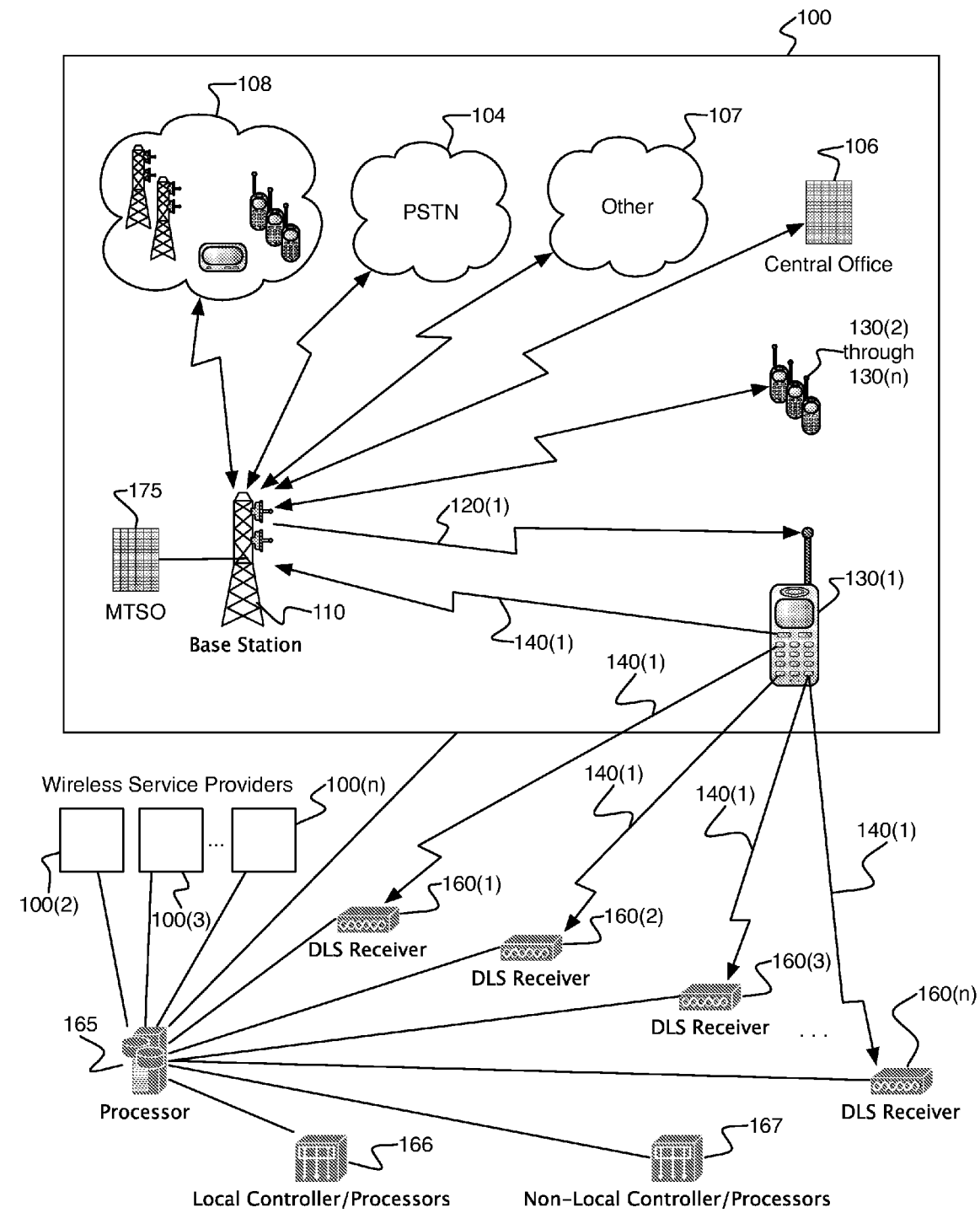
FIG. 1 is a diagrammatic depiction of a typical wireless communications network architecture, also referred to as a wireless communications system, for practicing aspects of the present invention.

With the above in mind, initial reference is now made to FIG. 1 which illustrates a wireless communication network architecture, in the form of a typical cellular telephone wireless service provider system 100, which may be used to practice aspects of the present invention. System 100 includes a base station 110 that transmits routine communication continuity "ping" or request signals 120(1) to two-way wireless terminal 130(1). Base station 110 is typically a cellular or other similar wireless radio frequency (RF) transceiver base station known by those skilled in the art. Base station 110 is also typically in communication, via a wireless or wired coupling, through none, one, or more base stations, cells, or other devices 108, to a switching station or central office 106, and, in turn, to the public switched telephone network (PSTN) 104 or other data network 107.

Base station 110 typically uses an RF overhead signaling channel to establish, supervise, and terminate voice or data communication sessions with two-way wireless terminals 130(1)-13(n) in system 100. Using the overhead RF channel, base Station 110 is typically in automatic repetitive two-way contact with each two-way wireless terminal 130(1)-13(n) within the serving area of system 100, performing a variety of administrative functions in the overhead RF spectrum, such as authentication, verification, detection of illegal "cloned" cell phones, identification of "roaming" users, and assessing the point at which a given active communication session needs to be handed off to the next cell in the system 100.

Request or ping signal 120(1) is transmitted in the overhead RF channel. Signal 120(1) modulates the RF link by using various modulation techniques, including, for example, Time Division Multiple Access (TDMA), Code Division Multiple Access (CDMA), Coded Orthogonal Frequency Division Multiplexing (COFDM), GSM, G3, and other similar modulation techniques well known to those skilled in the art. As also known in the art, signal 120(1) includes an identifier, flag, or other information 122(1) that is unique to a particular end user two-way wireless terminal, such as representative wireless terminal 130(1) in FIG. 1. As such, end user two-way wireless terminal 130(1) can discern that the request or ping signal 120(1) is for that particular end user two-way wireless terminal 130(1), as opposed to other two-way wireless terminals 130(2)-13(n) on the system 100.

Each end user two-way wireless terminal 130 may be, for example, a cellular telephone, pager, PDA, BlackBerry, or other similar wireless voice, data or multi-media communication device. Such two-way wireless terminals routinely emit RF return path signals toward base stations, even when no information communications session is in progress. In the event that two-way wireless terminal 130(1) is on and operational, upon receipt of request or ping signal 120(1), two-way wireless terminal 130(1) transmits an associated reply in the form of an automatic return signal 140(1) back to base station 110. Return signal 140(1) is generally transmitted in the administrative overhead RF channel, and is typically transmitted before any notification to the end user (e.g., before the two-way wireless terminal rings or vibrates, etc., and before the request for communication is "answered" by the end user).

Return path signals contain overhead information unique to the particular two-way wireless terminal, thereby also allowing localized detection, location and indirect control of specific end-user terminals within buildings, campus locations and other types of DLS facilities. Additionally, such locally obtained return path information may be used to control other intra- and extra-DLS systems or subsystems such as surveillance cameras. Return Signal 140(1) contains a unique TID/ESN 142(1) of the two-way Wireless Terminal 130(1) that received request or Ping Signal 120(1). TID/ESN 142(1) is used by Mobile Telephone Switching Office (MTSO) 175 to process the communication request. If there is no Return Signal 140(1) (including TID/ESN 142(1)) forthcoming from two-way Wireless Terminal 130(1), MTSO 175 assumes that two-way Wireless Terminal 130(1) is either switched off, not operational, and/or out of RF range of System 100. In such case, the calling party may be routed to voice mail, or to a standard network recording, depending on defined service option.

Although return signal 140(1) with the embedded TID/ESN 142(1) is intended for receipt only by base station 110 and MTSO 175 in system 100, it is also possible for other devices near two-way wireless terminal 130(1) to also receive return signal 140(1), typically in the RF spectrum. Thus, in accordance with the present invention, an array of synchronized DLS receivers, generally 160(1)-16(n) also receive return signal 140(1), and obtain the TID/ESN 142(1) information unique to two-way wireless terminal 130(1) within the DLS through decoding by processor 165 for the purpose of recovering TID/ESN 142(1) from return signal 140(1).

Synchronized DLS receivers 160(1)-16(n) are programmed to recognize terminal-specific TID/ESN 142(1)-142(n) transmitted from multiple two-way wireless terminals 130(1)-13(n) associated with multiple wireless technologies, within the DLS. Processor 165 associated with multiple synchronized DLS receivers 160(1)-16(n) detects, time stamps, determines exact intra-DLS physical location and prepares dynamic database for possible uploads to respective wireless service provider system 100, or other systems for active two-way wireless terminals 130 within DLS boundaries.

Processor 165 may be electromagnetically connected to a plurality of respective wireless service provider systems 100(2)-10(n) that have an RF "presence" within the DLS. Even for applications that do not involve indirect control of two-way wireless terminals 130, user-aware features and functions such as "silent" ringing or the on/off state of the terminal device, a given application may require an increased ping rate, perhaps to improve the precision of radiolocation within the DLS. Such increase in ping rate could be effected by uploading TID/ESN 142 information detected within a DLS to respective wireless service provider systems 100. If standard ping rate from wireless service provider systems 100 is satisfactory for the application and no indirect control of a two-way wireless terminal 130 is required, no communication from the DLS to associated system is required. Finally, and as also illustrated in FIG. 1, processor 165 may also be electromagnetically connected to DLS local controllers/processors 166 and non-local (remote) controllers/processors 167 to control systems and subsystems such as secure facility access, security cameras and the like.

Figure 2A:
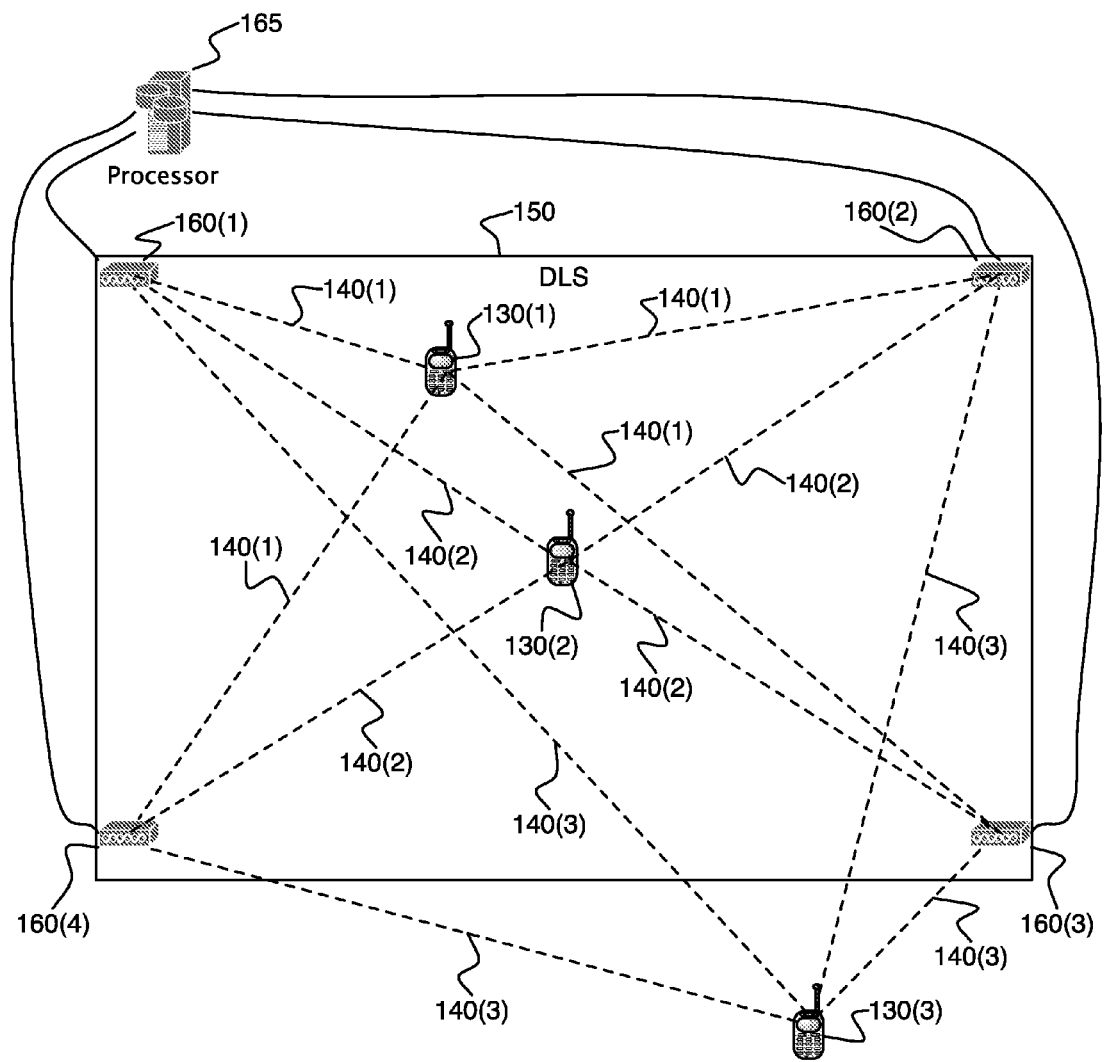
FIGS. 2a and 2b provide a diagrammatic view of one approach for practicing the present invention in an application that does not involve any direct or indirect control of two-way wireless terminal devices in a DLS environment.
Figure 2B:
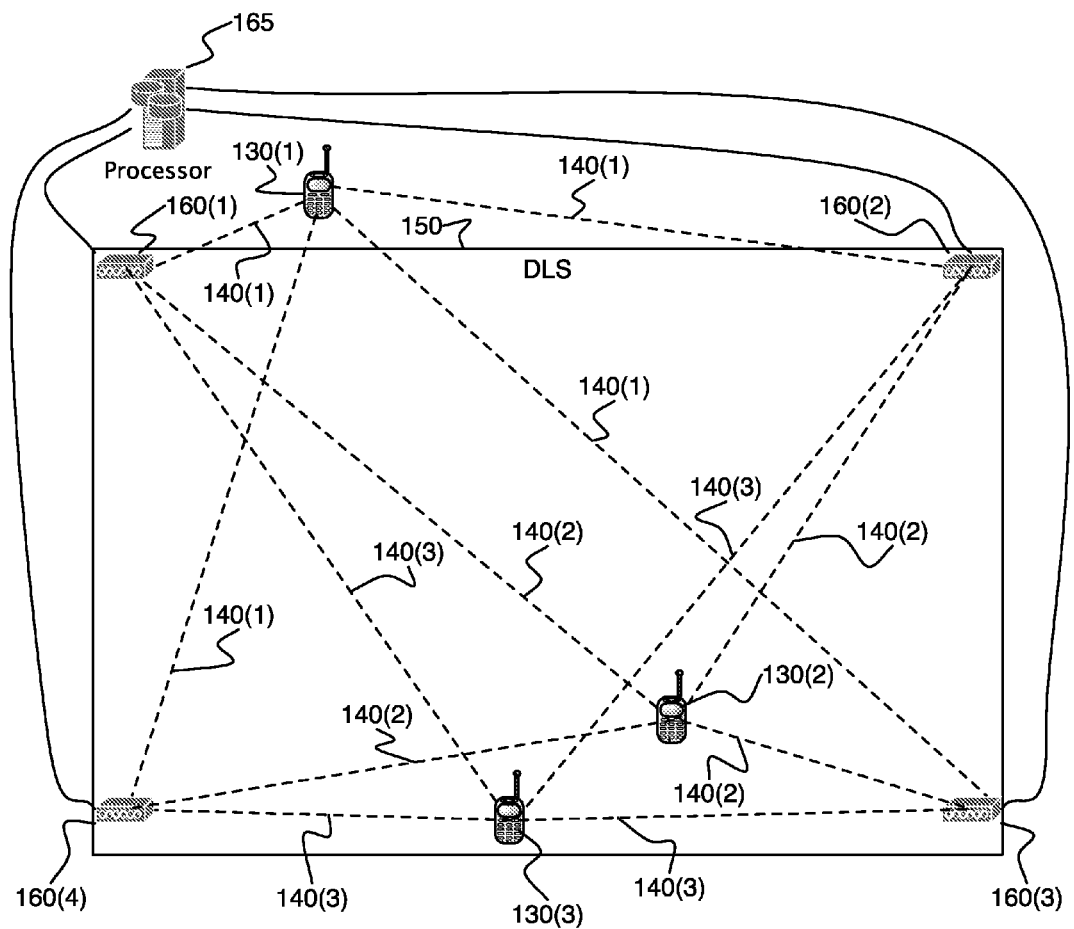

Turning now to FIGS. 2a and 2b, one approach for practicing the present invention for an application that does not involve any control of two-way wireless terminal devices 130 in a DLS environment is shown. The array of DLS receivers, generally 160, and their associated processor 165 detect and locate the specific physical position of all active two-way wireless terminals 130 within the DLS 150. Active two-way wireless terminals 130 outside DLS 150 are exempt from processing. DLS receivers 160 and associated processor 165 taken together include automatic radiolocation capability. Intra-DLS radiolocation of discrete two-way wireless terminals 130 is accomplished by relative time of arrival calculations, for all detected discrete TID/ESNs 142 of all terminal technologies that have an RF "presence" within the DLS 150. Here, a plurality, and preferably four or more, synchronized DLS Receivers 160(1)-160(4) are placed and connected together to processor 165, with actual physical distance calibration values obtained from actual placement of individual DLS receivers 160(1)-160(4). The connection to processor 165 can, of course, be accomplished through any of a variety of wired or wireless means. The resulting set of possible relative RF propagation time delays among all DLS receivers 160(1)-160(4) for all points within the three-dimensional region in a particular DLS allows immediate calculation by processor 165 of the specific physical location of two-way wireless terminals 130(1) and 130(2) within the DLS, and the immediate exclusion of two-way wireless terminal 130(3) that happen to be outside the boundaries of the DLS.

It can be appreciated, then, that the illustration of FIG. 2a corresponds to a first time interval during which each of receivers 160(1)-160(4), which comprise receiver array 160, intercepts associated return signals 140(1)-140(3) which is, respectfully, associated with wireless terminals 130(1)-130(3). Recall that each return signal might be responsive to a ping request transmitted in the overhead RF channel from an associated base station. The intercepted signals correspond to a first sampling of signals transmitted by an associated set of two-way wireless terminals within the DLS during the first time interval. It can be appreciated, then, that return signal 140(3) which is broadcast from a two-way wireless terminal 130(3) outside DLS 150 will fall outside the allowable set of possible DLS relative time delays, and any further calculation of physical location, counting, and all other application parameters may be aborted. Although a different physical architecture, it is such calculation of relative time of arrival of radio signals that make possible the Global Positioning System ("GPS") location capability. The DLS architecture and the present radiolocation method enable many disparate applications that require individual active two-way wireless terminal 130 physical position tracking within a DLS. In any event, the network architecture can, thus, ascertain that the first set of wireless terminals within the DLS during the first time interval only includes terminals 130(1) and 130(2). Initial location information can, thus, be logged for these two wireless terminals.

FIG. 2b illustrates a second time interval during which it may be seen that wireless terminal 130(3) has now moved into DLS 150, while wireless terminal 130(1) is now outside DLS 150. Accordingly, when the wireless terminals transmit their reply signals, these are intercepted by the synchronized DLS receivers 160(1)-160(4) as a second sampling of signals. This information is then transmitted to processor 165 which is able to ascertain that an associated second set of wireless terminals within the DLS now corresponds to terminals 130(2) and 130(3), but not 130(1). Here again, subsequent location information can now be logged for this second set of wireless terminals that are present within the DLS during the second time interval. The DLS architecture can thereafter compare the initial location information to the subsequent location information to ascertain tracking movement of the wireless terminals within the DLS, namely, that wireless terminal 130(1) has moved out of the DLS while wireless terminal 130(3) has moved into the DLS. It should be appreciated that FIGS. 2a and 2b illustrate a very simplistic version of events which can be monitored to ascertain movement of wireless terminals into and out of a given DLS. Of course, this foundation can be used to gather information pertaining to any of a variety of movement scenarios for a variety of DLS regions.

Figure 3A:
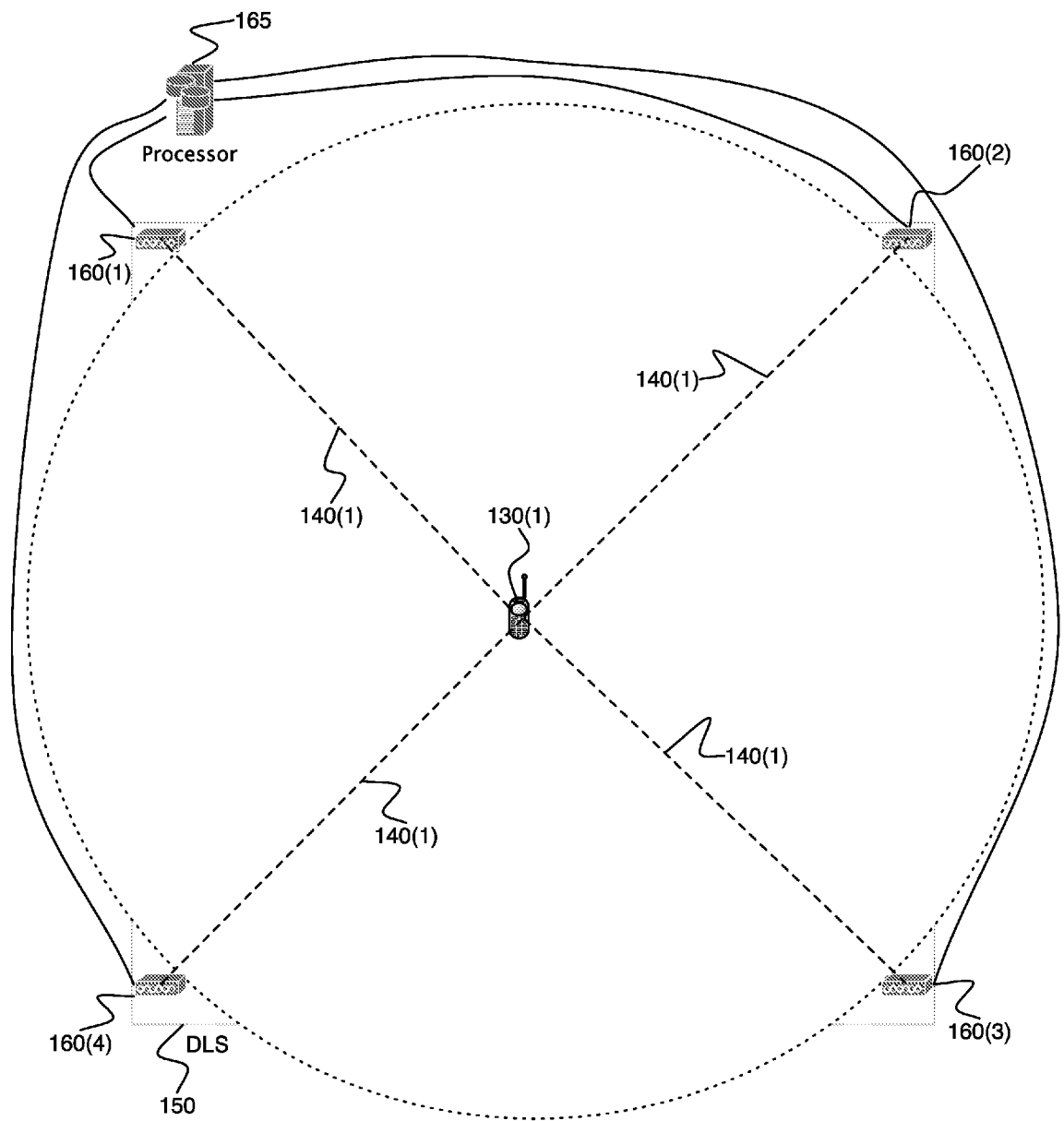
FIGS. 3a and 3b demonstrate in two dimensions a diagrammatic view of the method for practicing the present invention.
Figure 7:
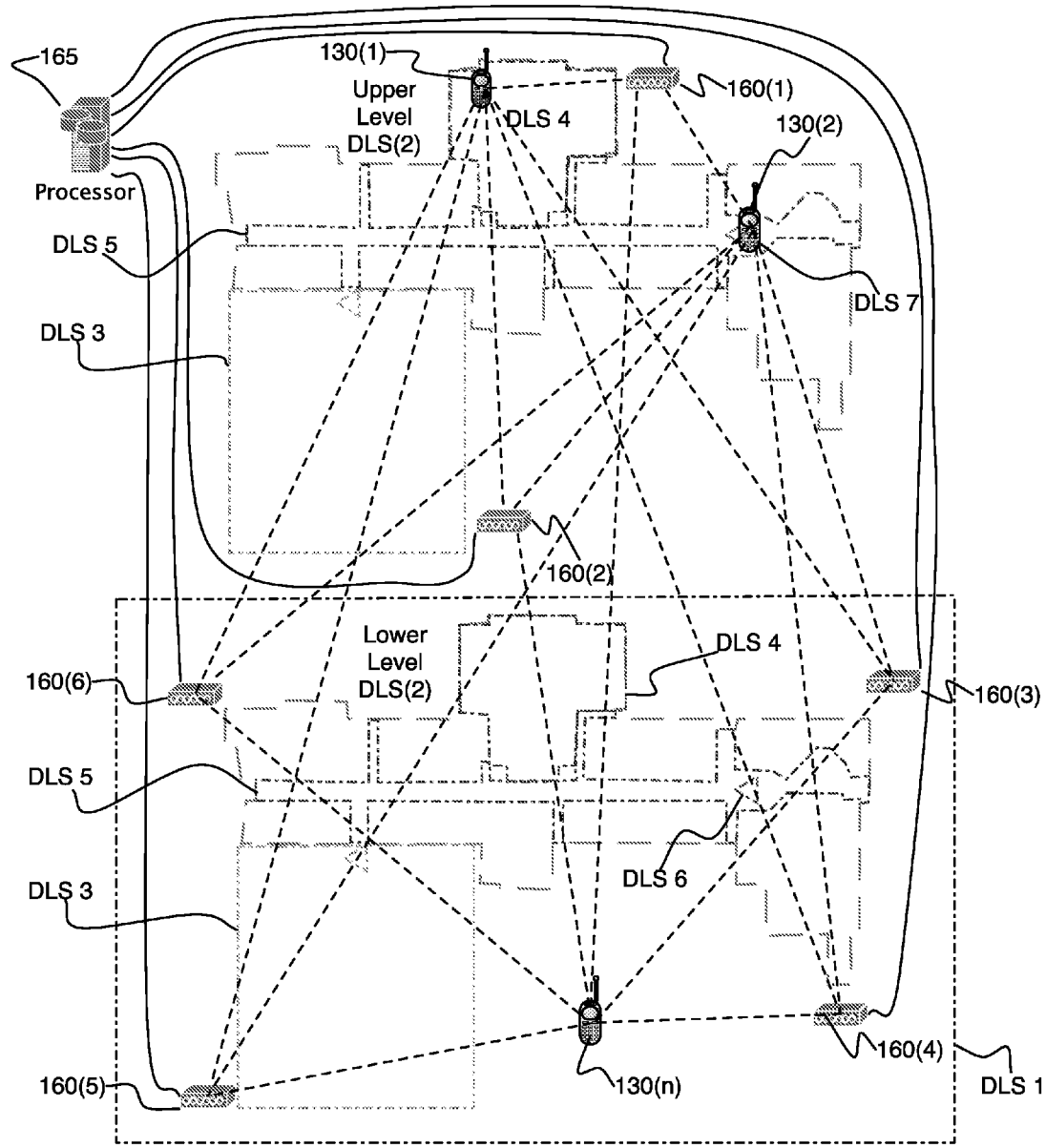
FIG. 7 illustrates a multi-DLS example environment using a representative DLS Receivers/Processor platform to create discrete sub-DLSs within a master DLS; and, FIGS. 8a and 8b illustrate different embodiments of an information gathering method according to the teachings herein.

Turning now to FIG. 3a, the radiolocation method is specifically illustrated. FIG. 3a is drawn in only two of the three dimensions to teach the radiolocation method with better clarity. The radiolocation method illustrated in FIG. 3a comprises a multiplicity of synchronized DLS receivers 160(1)-160(4) connected to a common processor 165, using relative time of arrival of modulated return-path signals 140(1) containing TID/ESN information to calculate the physical position of detected two-way wireless terminals in a DLS 150. Here, two-way wireless terminal 130(1) is located exactly equidistant from all four synchronized DLS receivers 160(1)-160(4). All synchronized DLS Receivers 160(1)-160(4) will, thus, receive the modulated return signal 140(1) at exactly the same instant in time, and processor 165 will calculate and report the position of said two-way wireless terminal 130(1) at only one possible position at the exact center in the area of a regular, two-dimension, four-sided polygon of the simplified illustration. If the four synchronized DLS receivers 160 (1)-160(4) are respectively arranged instead to become the points of an equilateral tetrahedron (a four-sided pyramid) and they all receive modulated return signal 140(1) at the same instant in time, two-way wireless terminal 130(1) is now reported by processor 165 to be at the exact center of the three-dimensional space within the pyramid. Accordingly, there is one and only one set of coordinate values for each physical point within the three-dimensional space of a given DLS 150. Synchronized DLS receivers 160(1)-160(4) and non-zero relative time of arrival calculations by processor 165 allow accurate dynamic radiolocation of each two-way wireless terminal in near real-time for all other possible points within the DLS 150, as well. This deterministic radiolocation method allows for the creation of a hierarchy of DLSs, permitting, for example, multiple unique DLSs for each store within a multi-tenant shopping mall, including common areas such as parking lots, walkways and multiple levels or stories, as shown in FIG. 7.

Figure 3B:
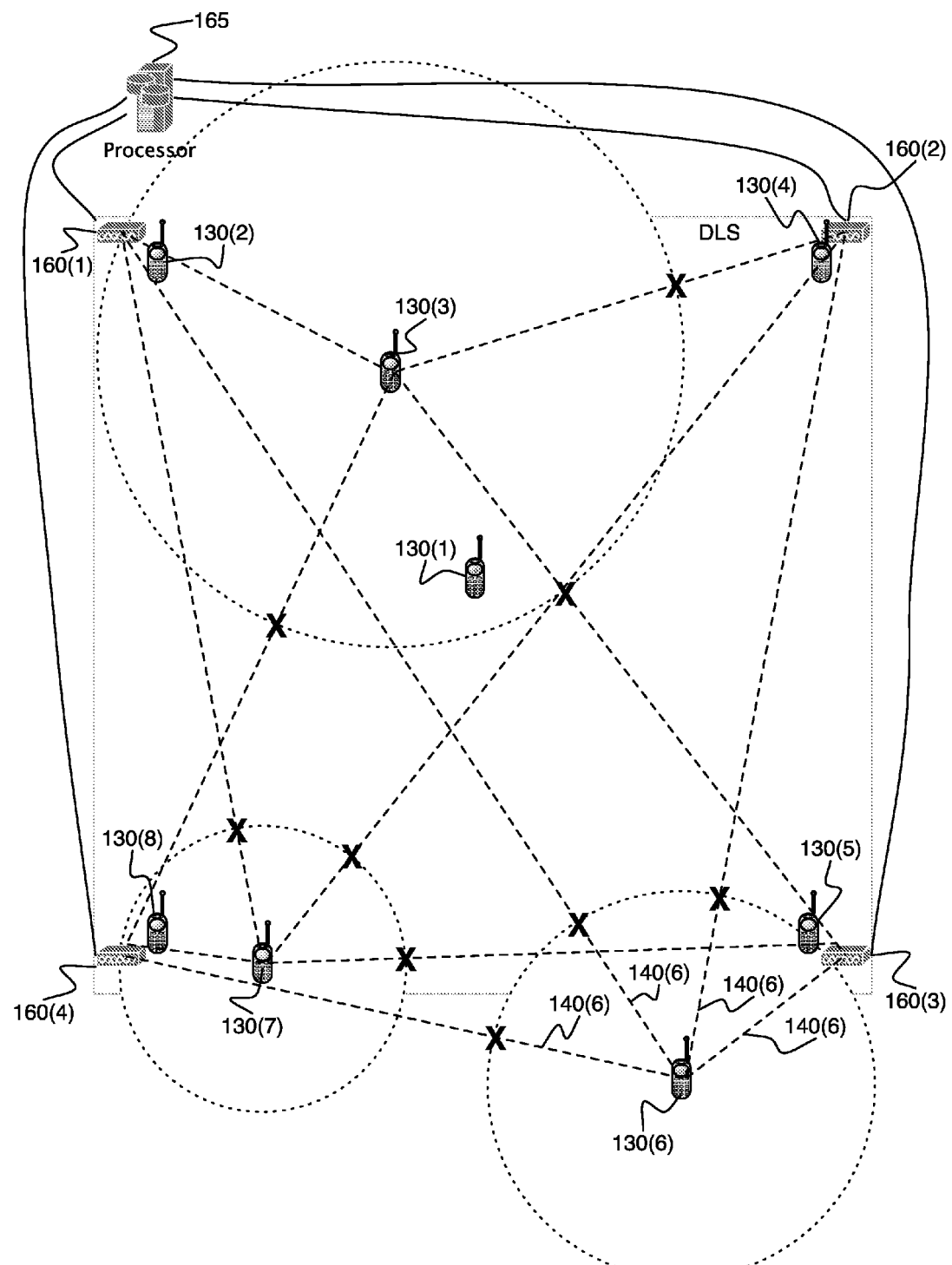

Turning now to FIG. 3*b*, the radiolocation method is illustrated for a multiplicity of other two-way wireless terminals 130(1)-130(8). Two-way wireless terminals 130(3), 130(6), and 130(7) are shown with dashed lines drawn to each of the four synchronized DLS receivers 160(1)-160(4). Two-way wireless terminals 130(1), 130(2), 130(3), 130(4), 130(5), 130(7), and 130(8) are physically within DLS 150, and two-way wireless terminal 130(6) is physically located outside DLS 150. The modulated return signal 140(6) from two-way wireless terminal 130(6) arrives first at DLS receiver 160(3), then slightly later in time at DLS receiver 160(4), then even later at DLS receiver 160(2), and lastly in time at DLS receiver 160(1). Processor 165 calculates the relative time of arrival ("RTOA") information from the multiplicity of synchronized DLS receivers for modulated return signal 140(6) and determines the location of two-way wireless terminal 130(6) to be outside the range of predetermined three-dimension coordinate values of DLS 150. Calculation of RTOA information from all other two-way wireless terminals 130 within DLS 150 by processor 165 allows the determination of exact location of each terminal at one and only one location within the DLS at any given instant in time.

Figure 4:
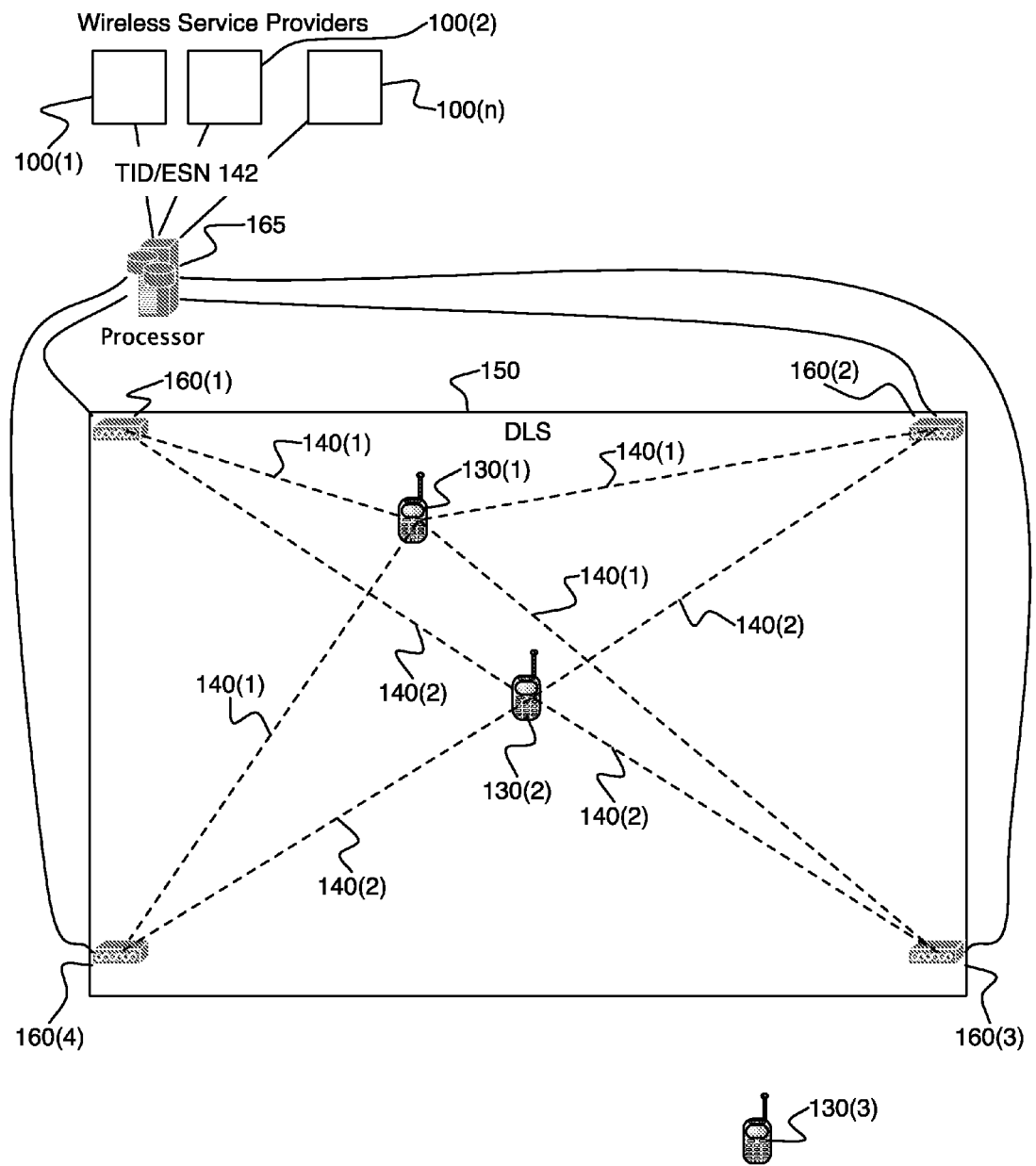
FIG. 4 is a diagrammatic view for illustrating one embodiment of an approach for practicing the present invention in an application that does involve indirect control of features and functions of one or more two-way wireless terminal devices in a DLS environment.

Turning now to FIG. 4, one embodiment of an approach is now depicted for practicing the present invention in an application that involves indirect control of features and functions of one or more two-way wireless terminals in a DLS environment. As in the previous embodiment, DLS Receivers 160 (1)-160(4) and associated processor 165 detect and specifically locate all two-way wireless terminals 130 of all wireless customers within the DLS 150. Processor 165 is programmed to also upload to respective wireless service providers 100 (1)-100(*n*) the TID/ESNs of all two-way wireless terminals 130(1)-13(*n*), respectively, detected within DLS 150, with instructions to silence and/or deny service to said terminals (except for outgoing E911 emergency calls) that are detected within DLS "quiet zones," for example, wireless terminals 130(1) and 130(2) here. For purposes of this example, the "quite zone" could correspond to the geometry of the DLS 150, itself. However, the ordinarily skilled artisan would also appreciate that the quite zone could be a particular subset space or spaces, within the DLS 150. The embodiment of FIG. 4 would understandably require a prior arrangement between the DLS entity 150 and all wireless service providers 100(1)-10(*n*) that have an RF "presence" within the DLS 150 desiring to establish such area-specific "quiet zones."

Figure 5:
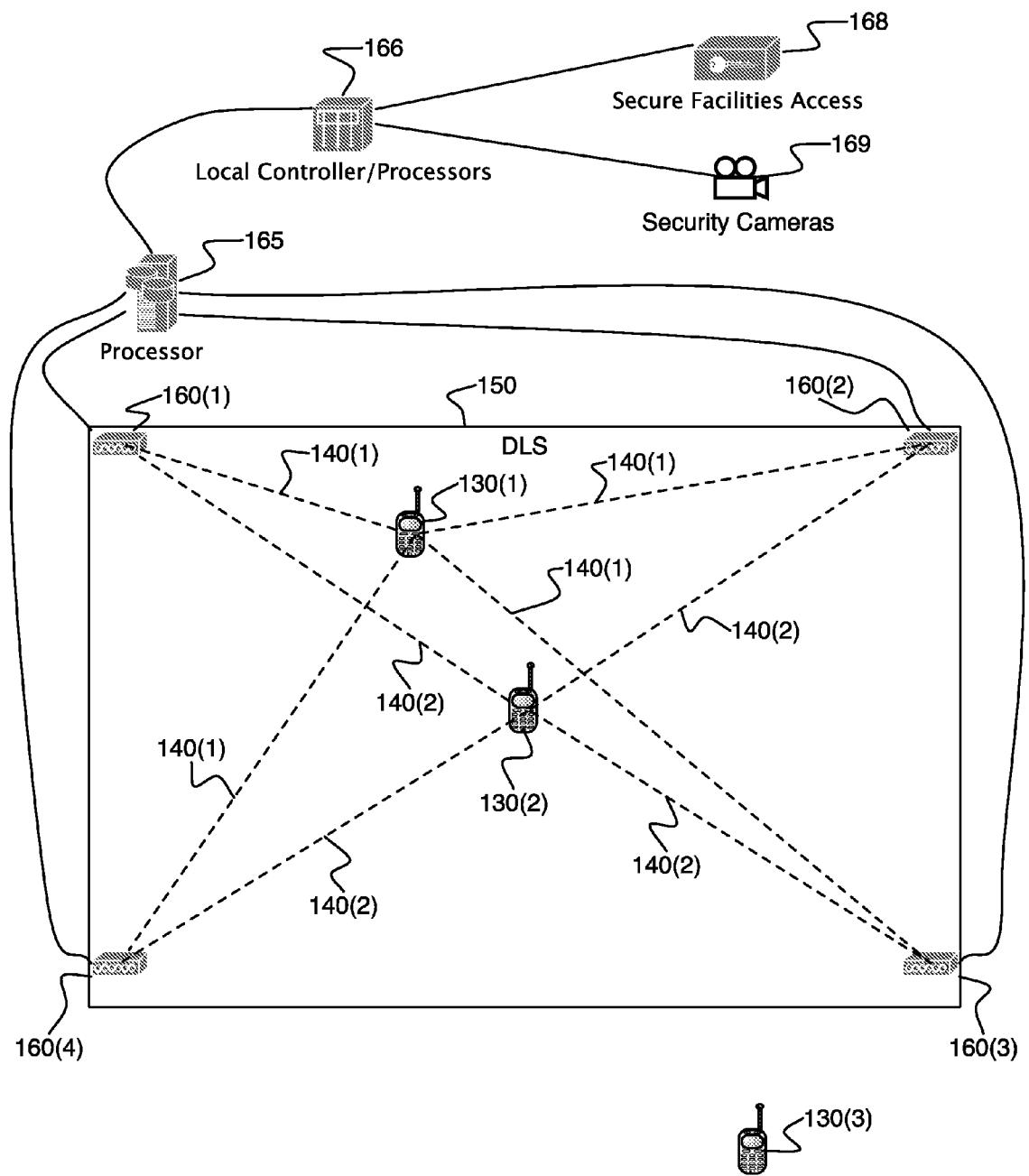
FIG. 5 is a diagrammatic view for illustrating one embodiment of an approach for practicing the present invention in an application that involves local-only limited control of DLS systems or subsystems according to specific two-way wireless terminals detected within the DLS.

Turning now to FIG. 5, one approach for practicing the present invention in an application that involves local-only limited control of DLS systems 150 or subsystems 168 and 169 according to specific two-way wireless terminals 130 detected within the DLS 150 is shown. Here, discrete two-way wireless terminals 130(1) and 130(2) that are detected and located by the DLS receiver array 160 and processor 165 provide input to local controllers/processors 166 of systems and subsystems only within DLS boundaries. Such local controllers/processors 166 may be used to control systems and subsystems such as secure facility access 168, security cameras 169, and the like. Rather than relying only on facial recognition in the situation of manually operated security cameras, this application enabled by the present invention would automatically and accurately "tag" a suspect with a self-training camera linked to a detected TID/ESN.

Figure 6:
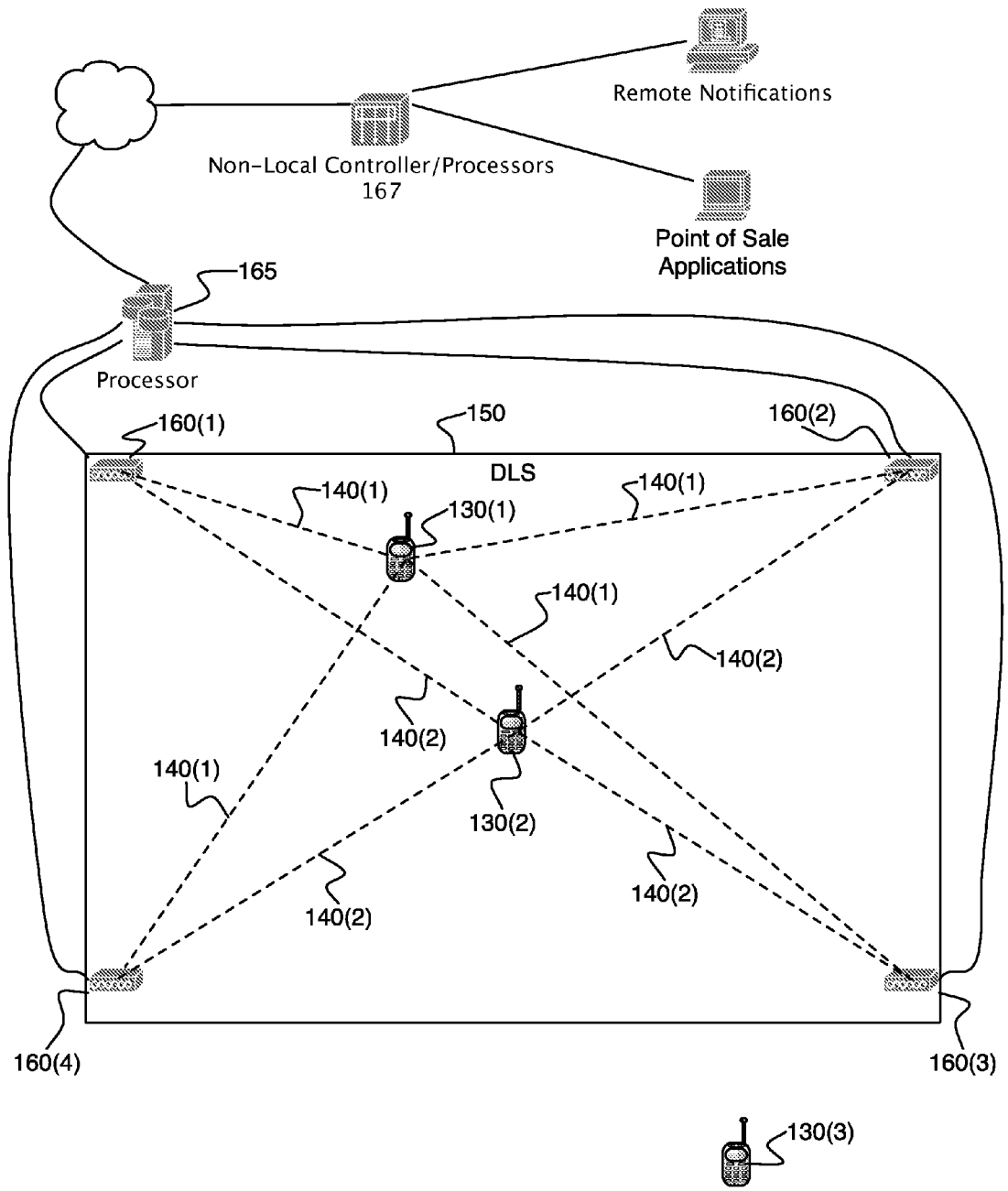
FIG. 6 illustrates one approach for practicing the present invention in an application that involves remote control of systems or subsystems outside DLS boundaries.

Turning now to FIG. 6, one embodiment of an approach for practicing the present invention in an application that involves remote control of systems or subsystems outside DLS boundaries is shown. Similar to the previous approach enabling the example local DLS application, this approach provides detected and processed information from within a DLS to other non-local controller/processors 167. Applications of such an embodiment include automatic remote notification of the appearance of a TID/ESN within another non-contiguous DLS location, such as among multiple satellite locations of a geographically diverse entity. Yet another extra-DLS application could require electronic association of a credit card number with detected customer TID/ESN before a point-of-sale transaction is remotely authorized.

Turning now to FIG. 7, one example of a multi-DLS environment using a common DLS receivers/processor platform to create discrete sub-DLSs within a master DLS is shown. Since all possible coordinate values for the three-dimensional space within a master DLS can be established, discrete sub-DLSs can also be established as defined exclusive subsets of master DLS coordinate values. A minimum of four synchronized DLS receivers 160 in a master DLS are required to establish any particular point in the included space of a defined sub-DLS, and the coordinate values will not be repeated in any of the remaining defined sub-DLSs within the master DLS. The example illustrated in FIG. 7 employs six synchronized DLS Receivers which comprise array 160(1)-160(6), but a greater number may be required for complete coverage of complex DLS environments. It will be obvious to those skilled in the art that the present invention may also be used in a variety of other similar DLS applications, including, for example, time-stamping specific TID/ESNs in specific areas of a DLS, for the purpose of identifying an unauthorized person.

Figure 8A:
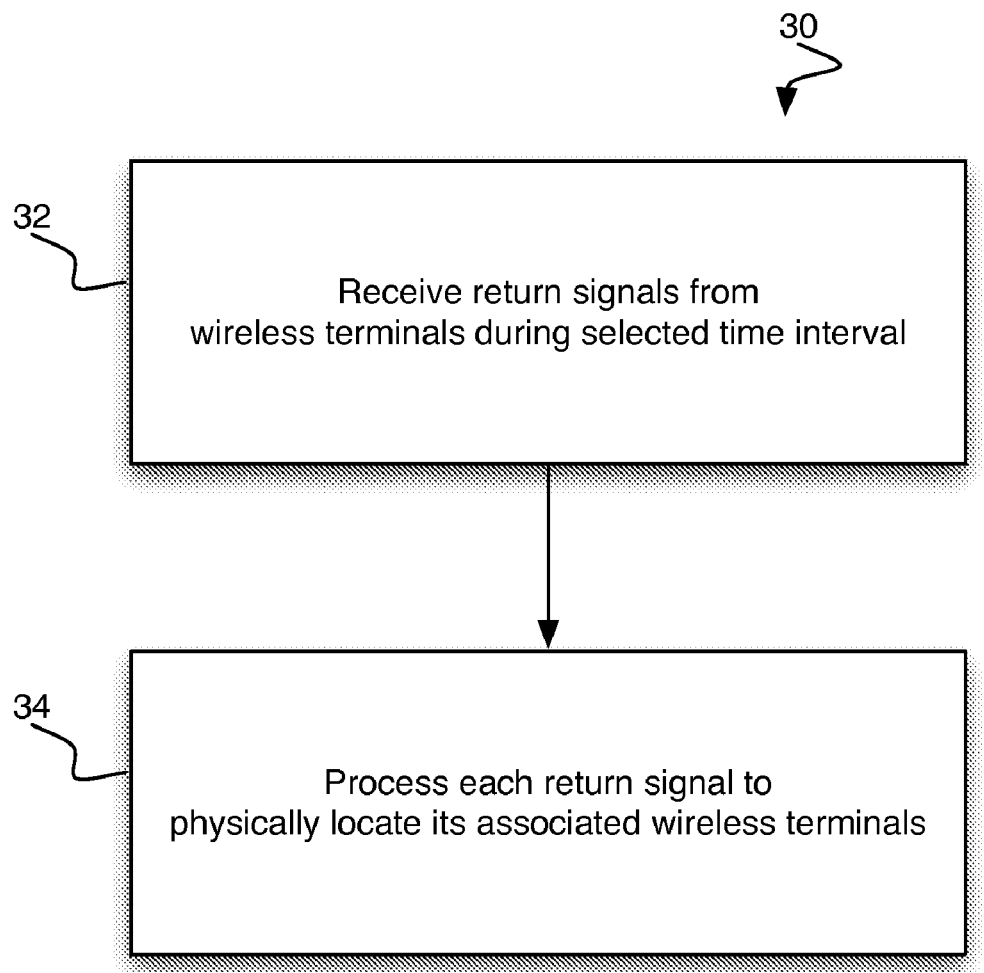

With the above description in mind, it may be appreciated that various methods are contemplated for gathering information. According to a broad version of a methodology 30 as shown in FIG. 8*a*, return-path signals that are transmitted from two-way wireless terminals within a DLS are received at 32 over a selected time interval and thereafter processed at 34 to ascertain physical location information about each signal's associated two-way wireless terminal within the DLS.

Figure 8B:
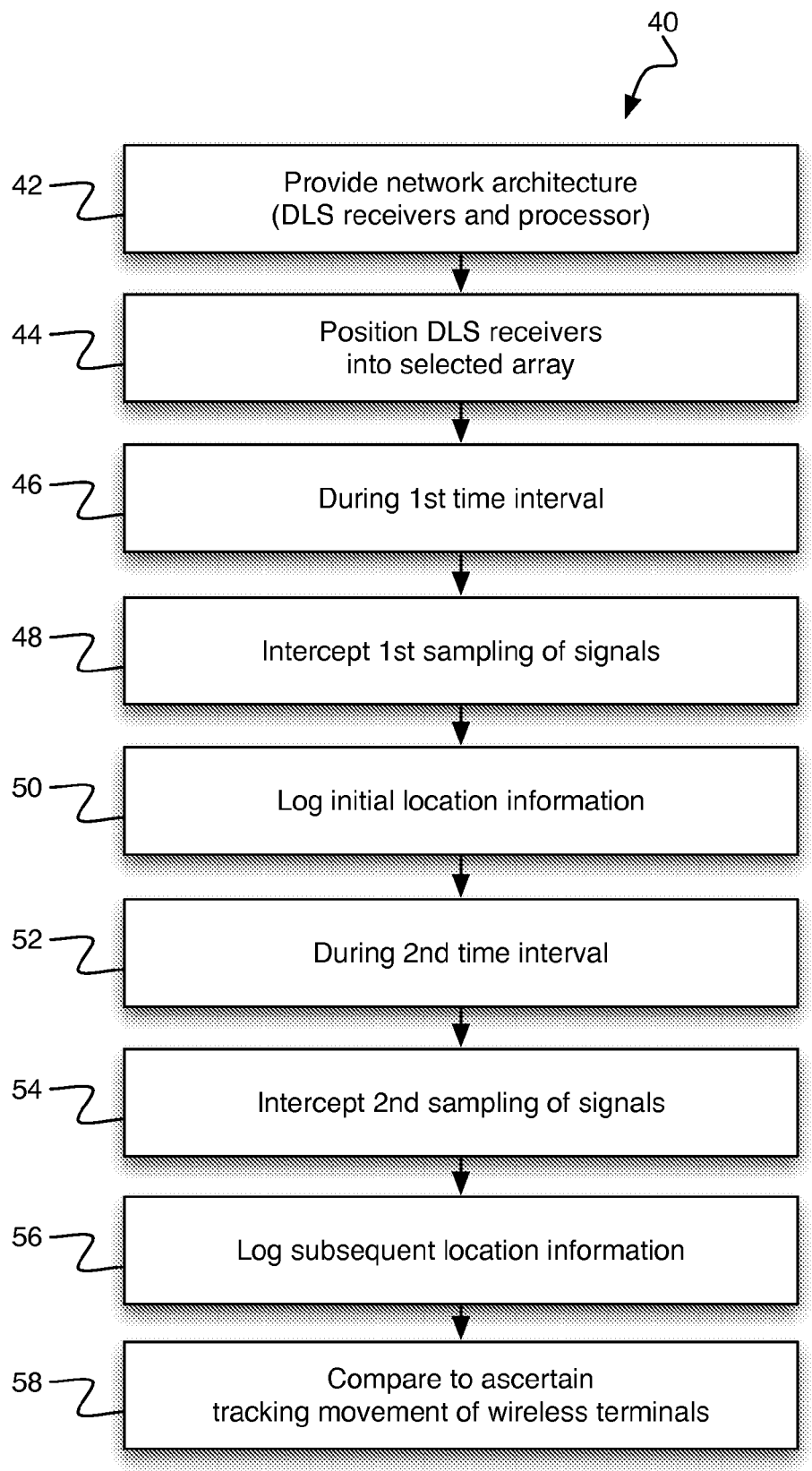

A more detailed, non-intrusive information gathering method 40 is diagrammed in FIG. 8*b*. Here, a network architecture is provided at 42. The network architecture includes a plurality of synchronized receivers and at least one processor, as discussed above. At 44, the receivers are positioned in a selected array to define the DLS. During a first time interval at 46, a first sampling of signals is intercepted by the receivers at 48. This first sampling of signals, as discussed above, is that which is transmitted by an associated first set of two-way wireless terminals within the DLS, with each received signal being associated with a particular one of the wireless terminals during the first time interval. At 50, initial location information is logged for the first set of wireless terminals. Thereafter, during a second time interval 52, a second sampling of signals is intercepted at 54, and subsequent location information is logged at 56 corresponding to the set of wireless terminals within the DLS during the second time interval. Then, at 58, the initial location information is compared to the subsequent location information to ascertain tracking movement of wireless terminals within the DLS.

Accordingly, the present invention has been described with some degree of particularity directed to the exemplary embodiments thereof. It should be appreciated, though, that the present invention is defined by the following claims construed in light of the prior art so that modifications or changes may be made to the exemplary embodiments of the present invention without departing from the inventive concepts contained herein.

What is claimed is:

1. A system for monitoring movement of two-way wireless terminals within a defined local space (DLS), comprising:
   a. a mathematically characterized DLS architecture, including:
      i. an array of at least four receivers which are volumetrically synchronized together to identify a volume within the defined local space (DLS);
      ii. at least one processor in communication with said array of receivers;
   b. at least one two-way wireless terminal; and
   c. a base station associated with a wireless service provider system, said base station adapted to periodically broadcast a series of request signals, each intended for a particular said wireless terminal, whereupon said DLS architecture is operative:
      i. during a first time interval to:
         1. intercept a first sampling of return signals transmitted by at least one associated first wireless terminal that is physically within said DLS during the first time interval; and
         2. log initial location information for the first wireless terminal within the DLS based on said first sampling of return signals;
      ii. during subsequent time intervals to:
         1. intercept at least one subsequent sampling of return signals transmitted by at least one associated wireless terminal that is physically located within the DLS during the subsequent time intervals; and
         2. log initial location information for the at least one associated wireless terminal within the DLS based on said sampling of return signals; and
      iii. to compare said initial location information to said subsequent location information to ascertain tracking movement of wireless terminals within the DLS.

2. A system according to claim 1 wherein each request signal is a service request or ping signal transmitted by a base station in an RF signaling channel, and wherein each request signal includes identifying information that is unique to a particular one of said two-way wireless terminals.

3. A system according to claim 1 wherein no personal information is obtained concerning any of the wireless terminals within the DLS.

4. A system according to claim 1 wherein each said wireless terminal is selected from a group consisting of a cellular telephone, a pager, a personal data assistant (PDA), and other similar two-way wireless terminal devices.

5. A system according to claim 1 wherein said processor is operative to time stamp and determine intra-DLS physical location of all wireless terminals within the DLS during the initial and all subsequent time intervals, respectively.

\* \* \* \* \*

UNITED STATES PATENT AND TRADEMARK OFFICE
Certificate

Patent No. 8,315,598 B2

Patented: November 20, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christopher Price, Denver, CO (US); and Gregory J. Beveridge, Thornton, CO (US).

Signed and Sealed this Third Day of September 2013.

KAMRAN AFSHAR
*Supervisory Patent Examiner*
Art Unit 2646
Technology Center 2600